United States Patent [19]

Wilton et al.

[11] 4,071,634

[45] Jan. 31, 1978

[54] PROTEINACEOUS LOW FAT SPREAD

[75] Inventors: Inga Elna Maria Wilton, Stockholm; Lennart Olof Gunnemar Envall, Lidingoe; Kurt Lage Sundstroem, Helsingborg, all of Sweden; David Patrick Joseph Moran, Potters Bar, England

[73] Assignee: Lever Brothers Company, New York, N.Y.

[21] Appl. No.: 737,926

[22] Filed: Nov. 2, 1976

[30] Foreign Application Priority Data

Nov. 7, 1975 United Kingdom ............... 46214/75

[51] Int. Cl.$^2$ .......................... A23D 3/00; A23D 3/02
[52] U.S. Cl. .................................................. 426/604
[58] Field of Search ...................... 426/603, 604, 613

[56] References Cited

U.S. PATENT DOCUMENTS

| 2,575,874 | 11/1951 | Herlow | 426/603 X |
| 3,266,904 | 8/1966 | Duin et al. | 426/604 |
| 3,360,377 | 12/1967 | Spitzer et al. | 426/604 |
| 3,360,378 | 12/1967 | Spitzer et al. | 426/604 |
| 3,519,436 | 7/1970 | Bauer et al. | 426/603 X |

Primary Examiner—Raymond N. Jones
Assistant Examiner—R. A. Yoncoskie
Attorney, Agent, or Firm—Melvin H. Kurtz

[57] ABSTRACT

The invention relates to water-in-oil type low fat spreads of a fat content of 30–50%, the continuous fatty phase containing a fat blend which is plastic at room temperature and the dispersed aqueous phase containing phosphatides, proteinaceous ingredients and dispersed fat.

6 Claims, No Drawings

PROTEINACEOUS LOW FAT SPREAD

The present invention relates to a low fat spread and to a process for its preparation. Low fat spreads generally are emulsions of the water-in-oil type, and are nowadays frequently used for spreading on bread instead of butter and margarine. Such products, which as compared with butter or margarine, contain a considerably reduced fat content (e.g. 30– 50% by weight of the emulsion as compared with about 80%) are particularly of importance for those who want to keep their body weight under control.

The problems often encountered in these types of products are that their organoleptic properties are inferior (as compared with butter or margarine) and/or that the emulsion stability thereof is inadequate; one product being too stable for a proper release of flavours from the dispersed aqueous phase, the other being insufficiently stable to keep the aqueous phase adequately dispersed under storage conditions.

The low fat spread of the present invention comprises a continuous plastic fatty phase and a dispersed proteinaceous aqueous phase, said aqueous phase containing both phosphatides and a fatty phase.

Suitably the continuous fatty phase contains a plastic margarine fat, e.g. one of a dilatation value at 10° C of 100–1000 mm$^3$/25g, preferably of no more than 500 mm$^3$/25g at 10°–20° C (the dilation values referred to in this specification are measured as described in Boekenoogen: "Analysis and Characterisation of Oils, Fats and Fat Products" 1964, Interscience Publishers London, pages 143–145).

The low fat spread of the invention can be prepared by emulsifying, cooling and working a fatty phase containing a fat blend, which is plastic at room temperature, and the balance of an aqueous phase that has been obtained by dispersing proteins, phosphatides and a fatty phase in water or any other suitable aqueous medium, e.g. skim milk.

Preferably a continuous fatty phase is used of a dilatation value at 10° C of at least 150. Excellent results have been obtained with a dispersed plastic fatty phase also hving a dilatation value at 10° C of 100–1000 mm$^3$/25g, preferably at least 150 mm$^3$/25g, although dispersed fat that is substantially liquid at temperatures as low as e.g. 5° C can often advantageously be used as well.

The content of the dispersed fat in the low fat spread of the invention is preferably within the range of about 1–30% by weight and particularly 1–8% by weight; the weight ratio of continuous to dispersed fat being preferably from (1:1) to (40:1).

The phosphatide content in the aqueous phase is preferably 0.01–2.0%, particularly no more than 1.0% and especially 0.2–0.8%.

(In this specification all percentages are by weight and calculated on the total weight of the low fat spread, unless otherwise specified.)

Suitable phosphatides are e.g. those present in soyabeans, rapeseed, eggs, and dairy products like milk, cream etc.; phosphatide mixtures containing the three basic components of soya-bean phosphatides i.e. inositol phosphatides, choline- and ethanol amine phosphatides, are particularly preferred.

The phosphatides can be used as such, or can have been subjected to a modification treatment, e.g. partial hydrolysis, acylation etc.

Preferably the continuous fatty phase also contains phosphatides, e.g. 0.01–0.5%.

For improving the stability of the product it preferably further comprises partial glycerides in the continuous fatty phase, particularly both in the continuous fatty phase and in the dispersed proteinaceous aqueous phase.

Suitable proportions of partial glycerides are for instance 0.01–0.5% by weight of the low fat spread for the continuous fatty phase and 0.01–0.5% for the dispersed fatty phase.

Preferably the partial glycerides in the continuous fatty phase are substantially saturated glycerides of fatty acids with 12–22 carbon atoms and particularly the partial glycerides in the dispersed fatty phase are of an iodine value of more than 30.

The proteinaceous ingredients of the aqueous phase can be present in proportions ranging from about 0.2–12%, preferably 2–8%. Suitable proteins are e.g. all sorts of milk proteins, vegetable proteins including soyabean and rapeseed proteins. Low proportions of protein are preferably compensated by relatively high proportions of dispersed fat, to guarantee a sufficiently high viscosity of the aqueous phase, which will allow the preparation of a stable product containing a continuous fatty phase. Preferably sodium caseinate is used as protein source. For reasons of bacteriological stability of the low fat spread as well as the solubility of the proteins, the pH of the aqueous phase should carefully be adjusted to values within the range of about 5–7.5, preferably from about 5.8–6.4.

It has further been found that the incorporation of bacteriologically soured proteins, especially milk proteins, if need be together with other protein sources, has a beneficial effect on the taste and shelf life of the low fat spread of the invention.

It has surprisingly been observed that notwithstanding the well-known tendency of proteins to promote the formation of oil-in-water type emulsions, the low fat spread of the present invention has a stable continuous fatty phase. Although Applicants do not want to bind themselves to any specific explanation, it is believed that the presence of dispersed fat particles in said aqueous phase to a great extent contributes to the stability of the product, due to the formation of clusters of dispersed and preferably crystallized fat globules, which globules adhere to each other probably because of the presence of membranes of phosphatides and/or proteinaceous material. The clusters in turn encapsulate part of the dispersed proteinaceous aqueous phase.

For obtaining optimum stability, without losing the benefit of the flavouring ingredients present in the aqueous phase, the process of preparing the protein, phosphatide and fat containing aqueous phase is of vital importance.

According to a preferred embodiment of the invention the low fat spread is made from an aqueous phase that has been prepared by blending water, proteins and an oil-in-water emulsion, the major part of the dispersed fat particles thereof having a major dimension within the range of 1–30, particularly 2–20 microns.

The process of the present invention preferably comprises the following sequence of steps:
Preparation of proteinaceous aqueous phase:
i. Disperse protein and minor ingredients, e.g. salt, flvours etc. in water.
ii. disperse fat and phosphatides in the proteinaceous phase and adjust the particle size of the major part of the dispersed fat to 1–30 microns, preferably by directly dispersing homogenised natural or artificial cream of a fat content of about 2-80% (calculated on the cream) to obtain fat particles of the described size in the proteinaceous aqueous phase.

Preparation of the low fat spread:

iii. Blend a molten fatty phase including emulsifiers and the proteinaceous aqueous phase obtained and preferably subject this blend to a pasteurisation treatment.

iiii. Subject the blend of fat and aqueous phase to a cooling and working treatment, e.g. by means of surface-scraped heat-exchangers and resting tubes of the type disclosed in Andersen and Williams, "Margarine" 1964, under conditions that will lead to the formation of a product with a continuous fat phase, v. Fill the cooled and worked emulsion obtained in suitable receptacles.

Care should be taken that during preparation of the low fat spread of the invention the viscosity of the fat, phosphatide and protein containing aqueous phase is sufficiently high to ensure that a low fat spread is obtained having a continuous fatty phase.

Parameters controlling the viscosity of the proteinaceous aqueous phase are for instance its temperature, its protein-, phosphatide- and fat content. Further adjustments can, if need, be, be made in a manner known per se, e.g. by the incorporation of viscosity increasing agents e.g. phosphates, citrates and/or thickening agents.

The invention will now be illustrated by the following Examples.

EXAMPLE I

The following ingredients were mixed at a temperature of 65° C.

| Water | 50.58 kg |
|---|---|
| Sodium caseinate | 7.5 kg |
| Salt | 1.5 kg |
| Potassium sorbate | 0.12 kg |
| $Na_2HPO_4 2H_2O$ | 0.15 kg |
| Citric acid | 0.10 kg |
| Saturated mono-di-glycerides of fully hydrogenated lard | 0.15 kg |

After thorough mixing 60 kg of aqueous ingredients were obtained.

An artificial cream was subsequently prepared from 7.5 kg of the previously prepared mixture of aqueous ingredients, 4.9 kg of a fat blend, consisting of 45 parts by weight of soyabean oil, 25 parts of palm oil and 30 parts of partially hydrogenated palm oil. 0.5 kg of whole soyabean phosphatides, 0.5 kg distilled partly saturated monoglycerides of unhydrogenated lard with an iodone value of 40. The dilatation values of the fat blend were 500 at 10° C, 400 at 15° C, 305 at 20° C, 195 at 25° C, 125 at 30° C and 50 at 35° C. The ingredients of the artificial cream were subsequently homogenized so as to obtain dispersed fat particles of about 3-15 microns. The artificial cream thus obtained was then blended with the remaining aqueous ingredients for preparing the proteinaceous aqueous phase.

This proteinaceous aqueous phase of a pH of 6.1 and of 50° C was pumped together with a mixture consisting of 45.7 kg of the same fat blend, 0.2 kg of saturated partial glycerides from fully hydrogenated lard and 0.1 kg of soyabean lecithin, which mixture was of a temperature of 50° C, to a mixing vessel. The mixture was subsequently pasteurized at 80°-90° C and cooled in a surface-scraped heat-exchanger to a temperature of 40° C and in a second surface-scraped heat-exchanger to 16° C. The emulsion obtained was subsequently fed to a crystallizer unit, where sufficient residence time was given for increasing the solid fat content and the product leaving that crystallizer at about 18° C was finally cooled in a surface-scraped heat-exchanger to a temperature of 11° C and packed in plastic tubs.

The product obtained had excellent organoleptic properties and did not show any water separation upon storage.

EXAMPLES II-X

Example I was repeated except that the content, and in Examples II, III, IX and X the type of dispersed fat were varied. Furthermore the protein content and/or the content of the continuous fat phase were varied. Good products were obtained; further details are compiled in the following Table.

The products of Examples VII and VIII were generally preferred with regard to taste, as well as to spreadability and stability of the emulsion on storage.

The products of Examples III and V were almost as good but slightly more gluey in taste.

Products IX and X had, in spite of a relatively high content of dispersed liquid oil, a firm plastic consistency.

The products of Examples II, IV and VI were excellently stably but as a result of a rather low dispersed fat content showed slightly less rapid flavour release than the product of Example VIII.

| Example No. | type of "cream" (oil-in-water emulsion used in aqueous phase) | % fat in "cream" (calculated on wt of "cream") | % fat in aqueous phase (calculated on wt low fat spread) | % caseinate (calculated on wt of low fat spread) | pH |
|---|---|---|---|---|---|
| II | dairy cream | 40 | 3 | 7.5 | 6.0 |
| III | soured whole milk | 3 | 1.5 | 6 | 6.8 |
| IV | vegetable plastic fat with skim milk | 40 | 3 | 7.5 | 6.8 |
| V | vegetable fat with caseinate solution | 8 | 5 | 7.5 | 5.8 |
| VI | vegetable fat with caseinate solution | 40 | 3 | 7.5 | 5.6 |
| VII | Vegetable fat with caseinate solution | 40 | 5 | 7.5 | 6.2 |

-continued

| Example No. | type of "cream" (oil-in-water emulsion used in aqueous phase) | % fat in "cream" (calculated on wt of "cream") | % fat in aqueous phase (calculated on wt low fat spread) | % caseinate (calculated on wt of low fat spread) | pH |
|---|---|---|---|---|---|
| VIII | vegetable fat with caseinate solution | 40 | 8 | 7.5 | 6.2 |
| IX | liquid soyabean oil in cream | 40 | 5 | 7.5 | 6.2 |
| X [x] | ibid + 1% butter-milk powder | 40 | 5 | 7.5 | 6.0 |

[x] low fat spread containing 50% fat in continuous phase.

We claim:
1. A low fat spread having a total fat content of 30 to 50% by weight comprising a continuous fatty phase containing a fat blend which is plastic at room temperature and a dispersed proteinaceous aqueous phase containing 0.01-2% of phosphatides, 2-8% of proteinaceous ingredients and 1-30% of dispersed fat, calculated on the weight of the low fat spread, the weight ratio of continuous to dispersed fat being from 1:1 to 40:1.

2. A low fat spread having a total fat content of 30 to 50% by weight comprising a continuous fatty phase, containing stabilizing amounts of phosphatides and partial glycerides, and a fat blend of dilatation value of 100–1000 mm$^3$125 g at 10°C, and a dispersed proteinaceous aqueous phase containing 0.01–2.0% of phosphatides, 0.01–0.5% of partial glycerides, 2–8% of proteinaceous ingredients, and 1–30% of dispersed fat, calculated on the weight of the low fat spread, the weight ratio of continuous to dispersed fat being from 1:1 to 40:1.

3. Low fat spread according to claim 1 in which the dispersed fatty phase comprises a fat blend of a dilatation value of 100–1000 mm$^3$/25 g at 10° C.

4. Low fat spread according to claim 1 comprising sodium caseinate.

5. A process for preparing a low fat spread according to claim 1, which comprises dispersing proteins, phosphatides and a fatty phase in water to prepare the aqueous phase and emulsifying, cooling and working a fatty phase containing a fat blend which is plastic at room temperature, and the aqueous phase.

6. Process according to claim 5, in which the aqueous phase has been prepared by blending water, proteins and an oil-in-water emulsion, the major part of the dispersed fat particles thereof having a major dimension within the range of 1–30 microns.

* * * * *